United States Patent
Lisenker et al.

(10) Patent No.: US 6,874,603 B2
(45) Date of Patent: Apr. 5, 2005

(54) MAGNETORHEOLOGICAL PISTON AND DAMPER ASSEMBLY

(75) Inventors: Ilya Lisenker, Miamisburg, OH (US); Randall L. Hofmann, Centerville, OH (US); Michael W. Hurtt, Waynesville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/339,504

(22) Filed: Jan. 9, 2003

(65) Prior Publication Data

US 2004/0134728 A1 Jul. 15, 2004

(51) Int. Cl.[7] .............................. F16F 9/53; F16F 9/34
(52) U.S. Cl. ............................... 188/267.2; 188/322.15
(58) Field of Search ............................ 188/267, 267.2, 188/266.1, 266.2, 280, 281, 282.1, 282.2, 283, 293, 322.13, 322.15, 322.16, 322.17, 322.22, 159, 164; 137/807, 815, 816, 831, 909; 251/129.01

(56) References Cited

U.S. PATENT DOCUMENTS

| | | | |
|---|---|---|---|
| 6,131,709 A | 10/2000 | Jolly et al. | |
| 6,158,470 A * | 12/2000 | Ivers et al. | 137/807 |
| 6,199,671 B1 * | 3/2001 | Thyssen | 188/62 |
| 6,318,519 B1 | 11/2001 | Kruckemeyer et al. | 188/267 |
| 6,318,520 B1 | 11/2001 | Lisenker et al. | 188/267 |
| 6,382,369 B1 | 5/2002 | Lisenker | |
| 6,390,252 B1 | 5/2002 | Namuduri et al. | |
| 6,419,058 B1 * | 7/2002 | Oliver et al. | 188/267.2 |
| 6,497,308 B2 | 12/2002 | Lisenker | |
| 6,525,289 B2 | 2/2003 | Ananthanarayanan et al. | |
| 6,612,409 B2 * | 9/2003 | Lun et al. | 188/267.2 |
| 6,637,560 B2 | 10/2003 | Oliver et al. | |

FOREIGN PATENT DOCUMENTS

| | | |
|---|---|---|
| EP | 1273820 | 1/2003 |
| FR | 2579283 | 9/1986 |
| JP | 57173632 A * | 10/1982 |

* cited by examiner

Primary Examiner—Thomas Williams
(74) Attorney, Agent, or Firm—Michael D. Smith

(57) ABSTRACT

The invention provides a magnetorheological piston and damper assembly. The piston includes a piston body including at least one bypass port and an annular gap formed therein. The bypass port is in fluid communication with the annular gap. The bypass port includes a longitudinal portion extending substantially parallel to a piston longitudinal axis, and a bend portion extending substantially away from the longitudinal axis. The annular gap is spaced apart from the longitudinal portion and extends substantially parallel to the piston longitudinal axis. During operation, fluid flows through the bypass port and annular gap. The damper assembly includes a rod and a housing including the fluid carried therein. The piston is slidably carried in the housing and operably attached to the rod.

25 Claims, 3 Drawing Sheets ent of the damper mechanism, etc.

MAGNETORHEOLOGICAL PISTON AND DAMPER ASSEMBLY

TECHNICAL FIELD OF THE INVENTION

The present invention relates generally to vehicular suspension systems. More particularly, the invention relates to a magnetorheological piston and damper assembly.

BACKGROUND OF THE INVENTION

Linear suspension dampers, such as shock absorbers and McPherson struts, may include a rod and piston moving within a fluid-filled housing. Suspension movements transmitted to the rod and piston may be dampened as the damper compresses and rebounds. Dampening forces are generated within the housing by fluid friction forces that oppose the movement of the rod and piston.

Current damper designs may include a magnetorheological (MR) fluid that allows the generated dampening forces to be selectively controlled. MR fluids are generally suspensions of magnetic particles such as iron or iron alloys in a fluid medium. The flow characteristics of these fluids can change by several orders of magnitude within milliseconds when subjected to a suitable magnetic field due to suspension of the particles. The ferromagnetic particles remain suspended under the influence of magnetic fields and applied forces. MR fluids are well known and have been found to have desirable electromagnetomechanical interactive properties for controlling dissipative forces along the damper's axis.

A linear acting MR damper piston may include a coil assembly, a core, and an annular piston ring positioned around the pole pieces to form an annular flow passageway. When the piston is displaced, MR fluid is forced through the passageway from one area of the damper housing to another. When the coil is energized, a magnetic field permeates a portion of the passageway and excites a transformation of the MR fluid to a state that exhibits increased damping force (i.e., the MR fluid viscosity is increased). The amount of dampening force may be selectively controlled by adjusting the current run through the coil assembly (e.g., the damper "on-state").

The damping performance of a suspension damper is largely dependent on the force-velocity characteristics of the damper. In standard suspension dampers of the prior art that do not use MR fluid, the force-velocity curve typically has a steeper slope at low velocities and desirably passes through the zero point of damping force at zero velocity, thus producing a smooth transition between damper movements in compression and extension directions. Without special design considerations, however, a suspension damper using MR fluid tends to have a force-velocity curve that intersects the force axis at a value above zero from the positive velocity side, and a value below zero from the negative velocity side, thus producing a jump in force between finite positive and negative values with each change in the direction of damper movement. These jumps in force tend to provide harshness to the vehicle ride which may be felt by the vehicle occupants.

To address this problem, a known design of a linear acting MR damper includes a piston having a substantially annular, magnetically energizable gap formed between a piston ring and core, and one or more magnetically non-energizable bypass ports positioned radially inward from the gap. The bypass ports provide means for allowing fluid flow through the piston that is not influenced by MR state transformations. As such, the bypass ports may prevent unwanted damper performance characteristics during on-state and at low temperatures. Accordingly, it would be desirable to provide an MR damper piston with the advantages of bypass ports.

In one piston design, the bypass ports extend across the piston core and through corresponding holes formed in flanking piston end plates. This design may have disadvantages. For example, as the piston typically includes a rebound bumper positioned adjacent one of the end plates, the bumper can extrude into the end plate holes during damper operation. This may significantly increase bumper wear-and-tear and failure rate. In addition, the end plate holes require alignment with the bypass ports and also weaken the end plate structure thereby increasing failure rate. Accordingly, it would be desirable to provide an MR damper piston that does not require hole(s) in the rebound bumper-side end plate.

Desirable damper performance usually requires that significantly less dampening forces are generated during a compression stroke as compared to a rebound stroke. Switching the MR fluid state may provide such "asymmetric" dampening forces. However, using MR state transformation to generate asymmetric dampening forces may have disadvantages. For example, a substantial amount of total MR dampening capacity may be used to generate rebound stroke dampening forces. The ability of the damper to handle finely-tuned dampening or other events may thus be diminished. Accordingly, it would be desirable to generate asymmetric dampening forces without the need for MR state transformations. The MR dampening capacity could thus be preserved to handle events requiring additional dampening force and for other circumstances.

Therefore, it would be desirable to provide a magnetorheological piston and damper assembly that overcomes the aforementioned and other disadvantages.

SUMMARY OF THE INVENTION

A first aspect of the present invention provides a magnetorheological piston. The piston includes a piston body including at least one bypass port and an annular gap formed therein. The bypass port is in fluid communication with the annular gap. The bypass port includes a longitudinal portion extending substantially parallel to a piston longitudinal axis, and a bend portion extending substantially away from the longitudinal axis. The annular gap is spaced apart from the longitudinal portion and extends substantially parallel to the piston longitudinal axis. During operation, fluid flows through the bypass port and annular gap.

A second aspect of the present invention provides a magnetorheological damper assembly. The assembly includes a rod, a housing including a fluid carried therein, and a piston slidably carried in the housing and operably attached to the rod. The piston may include the aforementioned features and functions described in the first aspect of the invention.

A third aspect of the present invention provides a magnetorheological piston. The piston includes a piston body with an annular gap formed therein. The piston further includes means for bypassing fluid flow from the annular gap during operation of the piston.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
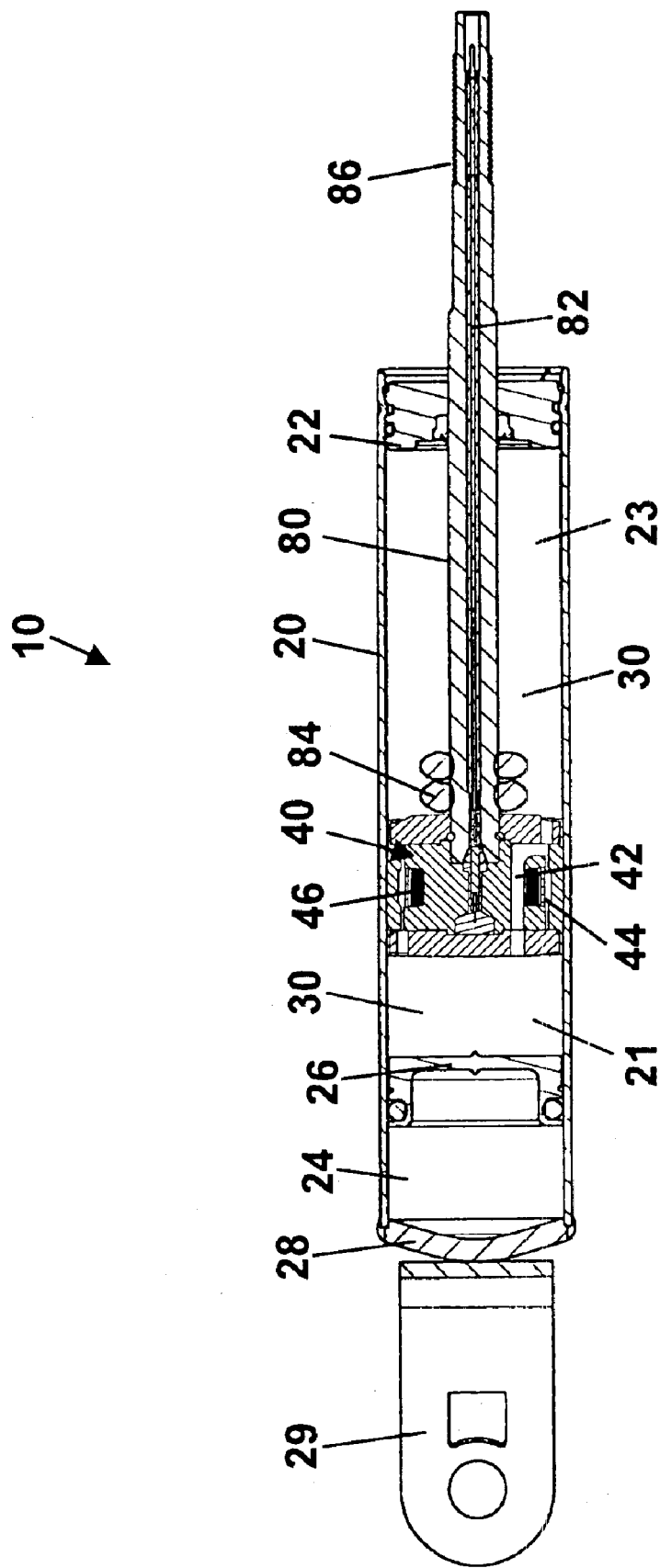
FIG. 1 is a cross-sectional view of a magnetorheological vehicle damper assembly in accordance with the present invention.

Referring to the drawings, wherein like reference numerals refer to like elements, FIG. 1 is a cross-sectional view of a magnetorheological damper assembly made in accordance with the present invention and shown generally by numeral 10. Those skilled in the art will recognize that the assembly 10 may include a number of alternate damper designs and may be employed in a variety of applications. In the present description, the assembly 10 is shown and described as a linear acting fluid magnetorheological (MR) damper for generating dampening forces in a motor vehicle suspension system.

Assembly 10 includes a rod 80, a housing 20 with a fluid 30 carried therein, and a piston 40 slidably carried in the housing 20 and operably attached to the rod 80. Piston 40 includes at least one, in this case four, bypass ports 42 and an annular gap 44 formed therein. The bypass ports 42 are in fluid communication with the annular gap 44.

In one embodiment, the housing 20 and rod 80 may be manufactured from a variety of sufficiently rigid material(s) such as steel, aluminum, metal, metal alloy, composites, and the like. Fluid 30 may be any type of MR fluids known in the art for use in MR-type vehicle dampers. Piston 40 may be formed from low-carbon steel with nickel plating. Low-carbon steel materials typically provide electro-magnetic induction properties compatible with MR fluids. Those skilled in the art will recognize that the nature of the fluid 30 and constituent materials of the assembly 10 may vary without limiting the operation of the present invention.

In one embodiment, the piston 40 may include a coil 46 for generating an electromagnetic field. Coil 46 may include one or more conductive elements, such as a metallic wire, for carrying an electric current. The electric current may be provided and controlled externally (e.g., by an electrical source and vehicle computer system) to dynamically regulate dampening forces. An electrical conductor 82 may extend through the rod 80 for providing electrical current to the coil 46 from an external power source (not shown).

In one embodiment, the rod 80 may include at least one, in this case two, bumpers 84 to limit piston 40 range of motion and "quiet" piston 40 contact with a first housing end portion 22 (e.g., during a rebound stroke). Bumpers 84 may be formed from an elastomeric material compatible with fluid 30, such as a polyurethane material. Housing 20 may include a gas 24 contained by a cap 26 to provide a force against piston 40 as it travels toward a second housing end portion 28 (e.g., during a compression stroke). Housing 20 and rod 80 may include a wheel assembly mount 29 and a vehicle chassis mount 86, respectively, to operably attach the assembly 10 to a vehicle.

Figures 2A, 2B:
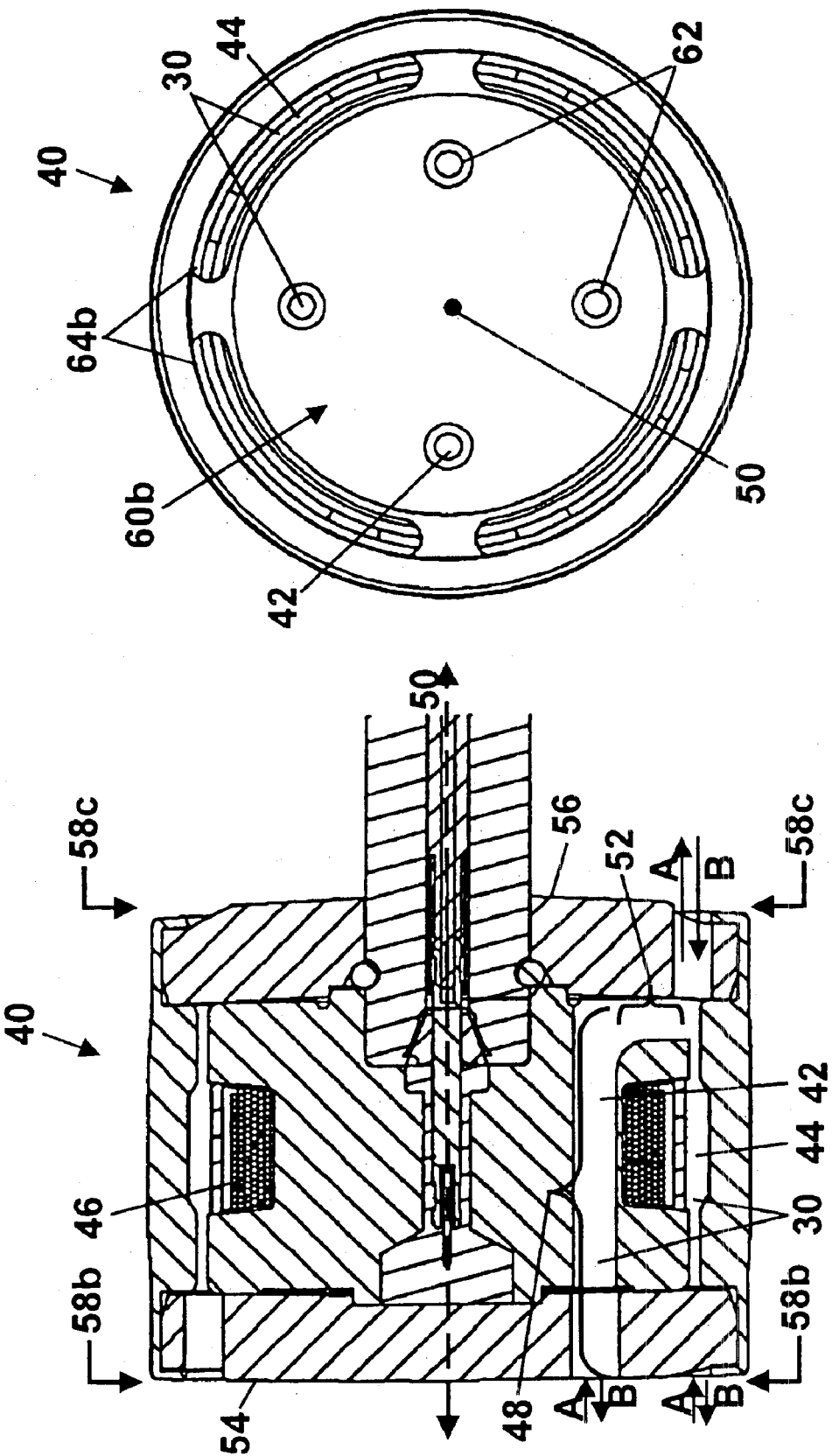
FIG. 2A is a detailed cross-sectional view of the piston shown in FIG. 1.
FIGS. 2B and 2C are alternate end views of the piston shown in FIG. 2A.

FIG. 2A is a detailed cross-sectional view of the piston 40 shown in FIG. 1. Bypass port 42 includes a longitudinal portion 48 extending substantially parallel to a piston longitudinal axis 50, and a bend portion 52 extending substantially away from the longitudinal axis 50. Annular gap 44 is spaced apart from the bypass port 42 longitudinal portion 48 and extends substantially parallel to the piston longitudinal axis 50. In one embodiment, the annular gap 44 may be positioned radially outward from the bypass port 42.

Annular gap 44 may have a substantially circular ring cross-sectional shape and may extend from a first piston surface 54 to a second piston surface 56 thereby allowing fluid 30 to pass through the piston 40. Annular gap 44 may be substantially magnetically energizeable by the coil 46. Coil 46 may be electrically energized thereby generated magnetic field, which may influence fluid 30 positioned within the annular gap 44. Bypass port 42 may be substantially magnetically non-energizeable and fluid 30 positioned therein may be substantially free of magnetic field effects. To reduce the field effects, the bypass port 42 may be sufficiently spaced apart from the coil 46, shielded from the magnetic field, and/or positioned along (e.g., parallel) pathway lines of magnetic flux. Those skilled in the art will recognize that the bypass port 42, annular gap 44, and coil 46 geometry, position, number, and magnetic field effects may vary without limiting the operation of the present invention.

FIG. 2B is an end view of the piston 40 of FIG. 2A taken along arrows 58b. Piston 40 may include an end plate 60b that is substantially disc shaped and may include at least one, in this case four, bypass openings 62 formed therein to allow fluid 30 flow into and out of the bypass ports 42. Each bypass openings 62 may be substantially aligned with a corresponding bypass port 42. Bypass ports 42 may be diametrically positioned wherein two bypass ports 42 may be spaced at approximately 180 degrees about the piston longitudinal axis 50. Piston 40 may include a plurality of, in this case four, openings 64b formed therein to allow fluid 30 flow through the piston 40 (i.e., through the annular gap 44). Those skilled in the art will appreciated that the bypass opening 62 and opening 64b geometry, number, and position may vary while allowing fluid 30 to flow through the piston 40 in accordance with the present invention.

Figure 2C:
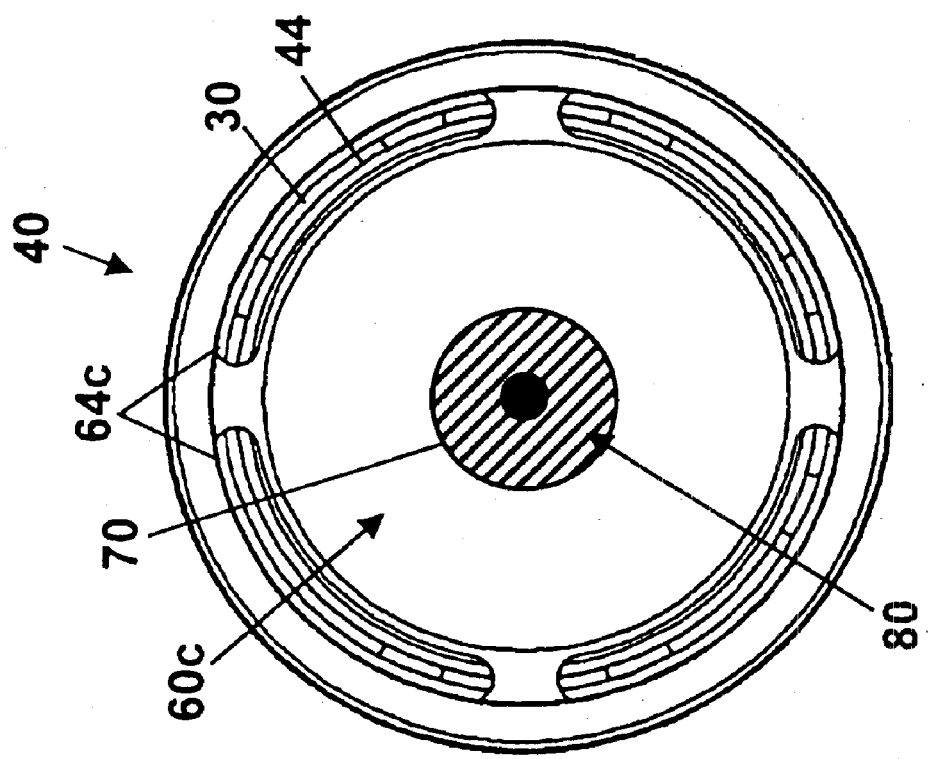

FIG. 2C is an end view of the piston 40 of FIG. 2A taken along arrows 58c. Piston 40 may include an end plate 60c that is substantially disc shaped and may include at least one opening 70 formed therein allowing the rod 80 to be positioned therethrough. Piston 40 may include a plurality of, in this case four, openings 64c formed therein to allow fluid 30 flow through the piston 40 (i.e., through the annular gap 44). Those skilled in the art will appreciated that the opening 64c geometry, number, and position may vary while allowing fluid 30 to flow through the piston 40 in accordance with the present invention. It should be noted that the end plate 60c does not include bypass opening(s). As such, the end plate 60c integrity may be maintained and proximally positioned bumper(s) will not extrude therethrough during damper operation.

Figure 3:
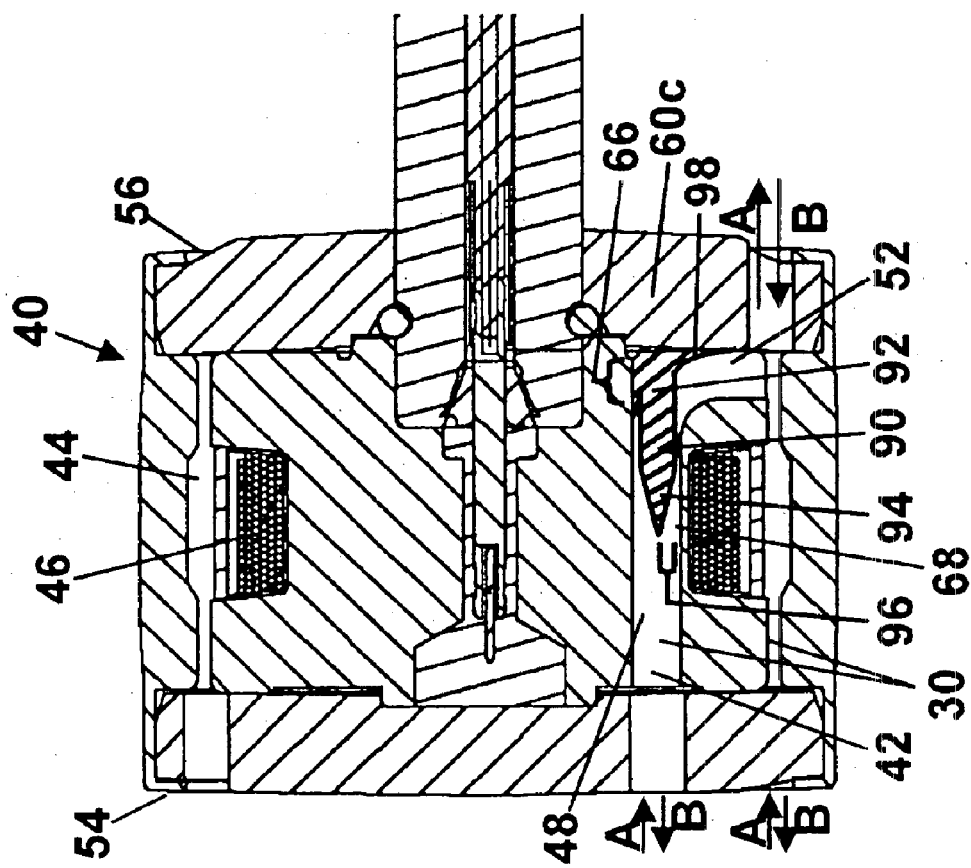
FIG. 3 is a detailed cross sectional view of another piston in accordance with the present invention.

Referring now to FIG. 3, the piston 40 may optionally include at least one valve 90 in fluid communication with the bypass port 42. Valve 90 may modulate the fluid 30 flow through the bypass port 42. The term "modulate" and derivatives thereof are meant herein to refer to the process(es) of adjusting or changing fluid 30 flow through the bypass port 42, usually to provide some advantage. For example, the fluid 30 flow may be modulated wherein fluid 30 flow resistance and turbulence are minimized by surface feature(s) of the valve 90 thereby reducing piston 40 vibration and noise.

Valve 90 may be operably attached to the end plate 60c. In one embodiment, the valve 90 may be integral to the end plate 60c. In another embodiment, the valve 90 may be attached to the end plate 60c by welding, adhesive, or other attachment means.

Valve 90 may provide an end plate 60c alignment with the piston 40. For example, the valve 90 shape may correspond to the bypass port 42 thereby allowing the end plate 60c to be easily and properly positioned during piston 40 assembly. In one embodiment, the valve 90 may be positioned substantially within the bypass port 42. Valve 90 may have a tapered shape including a root portion 92 configured to substantially occupy a portion 66 of the bypass port 42, and a tip portion 94 configured to provide a bypass gap 96 formed between the valve 90 and a bypass port surface 68. The valve 90 may include a curve portion 98 for turning the fluid 30 flow between the longitudinal portion 48 and the bend portion 52. In another embodiment, the valve 90 may positioned substantially outside the bypass port 42 and/or may have another shape for modulating fluid flow or other purpose.

Referring again to FIG. 1, operation of the assembly 10 is now described in the context of generating asymmetric dampening forces in a motor vehicle suspension system. During operation, forces exerted on the suspension system are opposed, or dampened, by the assembly 10 thereby providing a "smoother ride". Assembly 10 undergoes "compression" as the piston 40 slides toward the second housing end portion 28. Assembly 10 undergoes "rebound" as the piston 40 slides toward the first housing end portion 22. During compression and rebound, the fluid 30 may be forced to flow between a first 21 and a second 23 housing compartments through the bypass port 42 and/or annular gap 44. Furthermore, the optional valve 90 may modulate the fluid 30 flow through the bypass port 42. The fluid 30 flow and thus piston 40 movements are met with frictional resistance thereby generating the dampening forces.

Referring now to FIGS. 2A, 2B, 2C, and 3, the fluid 30 may flow through the annular gap 44 in a manner known in the art. Coil 46 may generate the magnetic field for increasing fluid 30 viscosity and flow resistance through the annular gap 44. In the damper on-state, the fluid 30 may be diverted from the annular gap 44 through the bypass port 42, which is substantially free of magnetic field effects. Therefore, piston 40 may generate minimal dampening forces at lower on-state damper velocities thereby providing 'smooth' vehicle ride characteristics.

The coil 46 and annular gap 44 may be used to generate asymmetric dampening forces, however, doing so typically requires rapidly switching the coil 46 current. Alternatively, the bypass port 42 may generate the asymmetric dampening forces by providing asymmetric fluid flow through the piston 40. As such, an MR dampening capacity provided by the annular gap 44 and coil 46 may be preserved to handle finely-tuned dampening and/or other events requiring additional dampening forces.

During a compression stroke, fluid 30 pressure on the first piston surface 54 initially exceeds fluid 30 flow resistance through the bypass port 42, but not the MR effect in the on-state annular gap 44. The pressure forces fluid 30 to flow into the bypass openings 62. Fluid 30 then flows through the corresponding bypass port 42 in direction A (shown in FIG. 2A). As fluid 30 flows through the bypass port 42, it follows along the longitudinal portion 48 and is then diverted radially by the bend portion 52 until it joins the annular gap 44. As the damper velocity increases, the pressure on the first piston surface 54 increases until it exceeds the MR effect in the annular gap 44 at which point the fluid 30 starts to flow through the annular gap 44 as well. The fluid 30 ultimately exits the annular gap 44 through openings 64c.

During a rebound stroke, fluid 30 pressure on the second piston surface 56 initially exceeds flow resistance through the bypass port 42, but not the MR effect in the on-state annular gap 44. The pressure forces fluid 30 to flow into openings 64c. Fluid 30 flows along the bypass port 42 in direction B (shown in FIG. 2A). As fluid 30 flows through the bypass port 42, it follows along the bend portion 52 and longitudinal portion 48 until it ultimately exits through openings 62. As the damper velocity increases, the fluid 30 pressure on the second piston surface 56 increases until it exceeds the MR effect in the annular gap 44 at which point the fluid 30 starts to flow through the annular gap 44 as well. The fluid 30 then ultimately exits the annular gap 44 through openings 64b.

In one embodiment, the fluid 30 flow may be asymmetric from compression and rebound strokes. For example, the fluid 30 flow may have less resistance during compression than during rebound. As such, the bypass port 42 may provide asymmetric fluid 30 flow that can generate asymmetric dampening forces. In another embodiment, the fluid 30 flow may have substantially equivalent resistances during compression and rebound. As such, the bypass port 42 may provide symmetric fluid 30 flow that can generate symmetric dampening forces.

Should the piston 40 include the optional valve 90, as shown in FIG. 3, then fluid 30 flow through the bypass port 42 may be additionally modulated by substantially minimizing flow turbulence. Valve 90 may minimize flow turbulence (e.g., resistance) or "noise" by including fluid-dynamic surface features that streamline flow and minimize vibrations. In one embodiment, the valve 90 tapered shape and curve portion 98 may modulate the fluid 30 flow through the bypass port 42. The tapered shape and curve portion 98 may substantially minimize fluid 30 flow drag thereby minimizing hydraulic resistance and turbulence. In another embodiment, the valve 90 may be shaped to provide asymmetric fluid 30 flow through the bypass port 42. For example, the valve 90 may include surface features that provide greater fluid 30 flow resistance in one direction than in another. As such, the valve 90 may provide asymmetric fluid 30 flow in addition to or in lieu of that provided by the bypass port 42.

Valve 90 also allows tuning of the fluid 30 flow through the bypass port 42. In one embodiment, the bypass gap 96 size may be adjusted to control the rate of fluid 30 flow therethrough and thus the dampening characteristics of the piston 40. In another embodiment, other features of the assembly 10 and piston 40 may be alternatively tuned to provide a myriad of dampening characteristics. For example, the bypass gap 96, valve 90, openings 64b, 64c, and bypass openings 62 may be sized to suit different dampening applications, as with different vehicle weights, dampening profiles, or vehicle handling characteristics.

It is important to note that the present invention is not limited to generating asymmetric dampening forces having greater dampening forces during rebound than compression. Those skilled in the art will recognize that the assembly 10, piston 40, bypass port 42, valve 90 and portions thereof may be easily adapted to provide greater dampening forces during compression than rebound. It should further be noted that an assembly and piston of the present invention may be easily adapted to generate symmetric dampening forces. For example, the bypass port 42 and valve 90 may be adapted to provide symmetric fluid flow during both compression and rebound strokes.

While the embodiments of the invention disclosed herein are presently considered to be preferred, various changes and modifications can be made without departing from the spirit and scope of the invention. For example, the damper assembly and piston are not limited to any particular design, configuration, or arrangement. Specifically, the valve, bypass port, annular gap, and opening configuration, size, shape, geometry, location, orientation, and number, may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A magnetorheological piston comprising:
    a piston body including at least one bypass port and an annular gap formed therein; wherein the at least one bypass port is in fluid communication with the annular gap; wherein the at least one bypass port includes a longitudinal portion extending substantially parallel to a piston longitudinal axis, and a bend portion extending substantially away from the longitudinal axis; wherein the annular gap is spaced apart from the longitudinal portion and extends substantially parallel to the piston longitudinal axis; wherein fluid flows through the at least one bypass port and the annular gap during operation of the piston; and
    at least one valve in fluid communication with the at least one bypass port wherein the valve modulates the fluid flow through the at least one bypass port during operation of the piston; wherein the valve is operably attached to a piston end plate; and
    wherein the valve comprises a tapered shape including a root portion configured to substantially occupy a portion of the at least one bypass port, and a tip portion configured to provide a bypass gap formed between the valve and a bypass port surface.

2. The piston of claim 1 wherein the annular gap is substantially magnetically energizeable and the at least one bypass port is substantially magnetically non-energizeable.

3. The piston of claim 1 wherein a portion of the fluid flow is diverted from the annular gap through the at least one bypass port during damper on-state.

4. The piston of claim 1 wherein the fluid flow through the at least one bypass port substantially follows lines of magnetic flux.

5. The piston of claim 1 wherein the fluid flow through the at least one bypass port is asymmetric.

6. The piston of claim 1 wherein the valve comprises a curve portion for turning the fluid flow between the longitudinal portion and the bend portion.

7. The piston of claim 1 wherein modulating the fluid flow comprises substantially minimizing turbulence in the fluid flow.

8. The piston of claim 1 wherein the valve provides a piston end plate alignment with the piston.

9. A magnetorheological damper assembly comprising:
    a rod;
    a housing including a fluid carried therein;
    a piston slidably carried in the housing and operably attached to the rod, the piston including at least one bypass port and an annular gap formed therein; wherein the at least one bypass post is in fluid communication with the annular gap; wherein the at least one bypass post includes a longitudinal portion extending substantially parallel to a piston longitudinal axis, and a bend portion extending substantially away from the longitudinal axis; wherein the annular gap is spaced apart from the longitudinal portion and extends substantially parallel to the piston longitudinal axis; wherein the fluid flows through the at least one bypass port and the annular gap during operation of the assembly;
    at least one valve in fluid communication the at least one bypass port wherein the valve modulates the fluid flow through the at least one bypass port during operation of the assembly; wherein the valve is operably attached to a piston end plate; and wherein the valve comprises a tapered shape including a root portion configured to substantially occupy a portion of the at least one bypass port, and a tip portion configured to provide a bypass gap formed between the valve and a bypass port surface.

10. The assembly of claim 9 wherein the annular gap is substantially magnetically energizeable and the at least one bypass port is substantially magnetically non-energizable.

11. The assembly of claim 9 wherein a portion of the fluid flow is diverted from the annular gap through the at least one bypass port during damper on-state.

12. The assembly of claim 9 wherein the fluid flow through the at least one bypass port substantially follows lines of magnetic flux.

13. The assembly of claim 9 wherein the fluid flow through the at least one bypass port is asymmetric.

14. The assembly of claim 9 wherein the valve provides a piston end plate alignment with the piston.

15. The assembly of claim 9 wherein the valve comprises a curve portion for turning the fluid flow between the longitudinal portion and the bend portion.

16. The assembly of claim 9 wherein modulating the fluid flow comprises substantially minimizing turbulence in the fluid flow.

17. A magnetorheological piston comprising:
   a piston body including at least one bypass port and an annular gap formed therein; wherein the at least one bypass port is in fluid communication with the annular gap; wherein the at least one bypass port includes a longitudinal portion extending substantially parallel to a piston longitudinal axis, and a bend portion extending substantially away from the longitudinal axis; wherein the annular gap is spaced apart from the longitudinal portion and extends substantially parallel to the piston longitudinal axis; and
   at least one piston end plate positioned adjacent the piston body, the piston end plate including an annular gap opening formed therein; wherein fluid flow the at least one bypass port and the annular gap join prior to flow through the annular gap opening during operation of the piston.

18. The piston of claim 17 wherein a portion of the fluid flow is diverted from the annular gap through the bypass port during damper on-state.

19. The piston of claim 17 wherein the fluid flow through the bypass port is asymmetric.

20. The piston of claim 17 further comprising at least one valve in fluid communication with the bypass port wherein the valve modulates the fluid flow through the bypass port during operation of the piston.

21. The piston of claim 20 wherein the valve is operably attached to the piston end plate.

22. The piston of claim 21 wherein the valve provides a piston end plate alignment with the piston.

23. The piston of claim 20 wherein the valve comprises a tapered shape including a root portion configured to substantially occupy a portion of the bypass port, and a tip portion configured to provide a bypass gap formed between the valve and a bypass port surface.

24. The piston of claim 20 wherein the valve comprises a curve portion for turning the fluid flow between the longitudinal portion and the bend portion.

25. The piston of claim 20 wherein modulating the fluid flow comprises substantially minimizing turbulence in the fluid flow.

* * * * *